US009736834B2

(12) United States Patent
Davydov et al.

(10) Patent No.: US 9,736,834 B2
(45) Date of Patent: Aug. 15, 2017

(54) APPARATUS, METHOD, AND SYSTEM OF INTER-NODE COMMUNICATION

(71) Applicant: INTEL CORPORATION, Santa Clara, CA (US)

(72) Inventors: Alexei Davydov, Nizhny Novgorod (RU); Alexander Maltsev, Nizhny Nobgorod (RU); Gregory Morozov, Nizhny Novgorod (RU); Alexander Sirotkin, Giv'on Hachadasha (IL)

(73) Assignee: INTEL CORPORATION, Santa Clara, CA (US)

( * ) Notice: Subject to any disclaimer, the term of this patent is extended or adjusted under 35 U.S.C. 154(b) by 147 days.

(21) Appl. No.: 14/492,333

(22) Filed: Sep. 22, 2014

(65) Prior Publication Data

US 2015/0215934 A1 Jul. 30, 2015

Related U.S. Application Data

(60) Provisional application No. 61/933,859, filed on Jan. 30, 2014.

(51) Int. Cl.
*H04W 72/04* (2009.01)
*H04B 7/024* (2017.01)
(Continued)

(52) U.S. Cl.
CPC ........ *H04W 72/0426* (2013.01); *H04B 7/024* (2013.01); *H04B 7/0456* (2013.01);
(Continued)

(58) Field of Classification Search
CPC ........... H04W 72/0426; H04W 52/143; H04W 52/226; H04W 52/243; H04W 52/247;
(Continued)

(56) References Cited

U.S. PATENT DOCUMENTS

2011/0211622 A1* 9/2011 Wang et al. ......... H04B 7/0408
375/220
2012/0076028 A1* 3/2012 Ko et al. ............... H04L 1/0026
370/252
(Continued)

FOREIGN PATENT DOCUMENTS

| EP | 2680639 | 2/2012 |
|---|---|---|
| WO | 2013068155 | 5/2013 |

OTHER PUBLICATIONS

Office Action for Taiwanese Patent Application Serial No. 104101171, mailed on Feb. 24, 2016, 29 pages (Including 13 pages of English translation.).
(Continued)

*Primary Examiner* — Walter Divito
(74) *Attorney, Agent, or Firm* — Shichrur & Co.

(57) ABSTRACT

Some demonstrative embodiments include devices, systems and/or methods of inter-node communication. For example, a first node may communicate with a second node, e.g., via a backhaul link, one or more messages including a restriction recommendation and/or a restriction setting, for example, a precoding restriction, a Relative Narrowband TX Power indication (RNTP) setting, and/or a Relative Wideband Transmit Power (RWTP) setting.

24 Claims, 5 Drawing Sheets

(51) Int. Cl.
*H04B 7/0456* (2017.01)
*H04B 7/04* (2017.01)
*H04B 7/06* (2006.01)
*H04W 72/12* (2009.01)
*H04W 92/20* (2009.01)
*H04W 52/14* (2009.01)
*H04W 52/22* (2009.01)
*H04W 52/24* (2009.01)

(52) U.S. Cl.
CPC ......... *H04B 7/0478* (2013.01); *H04B 7/0617* (2013.01); *H04W 52/143* (2013.01); *H04W 52/226* (2013.01); *H04W 52/243* (2013.01); *H04W 52/247* (2013.01); *H04W 72/1263* (2013.01); *H04W 92/20* (2013.01)

(58) Field of Classification Search
CPC .. H04W 72/1268; H04W 92/20; H04B 7/024; H04B 7/0456; H04B 7/0617
See application file for complete search history.

(56) References Cited

U.S. PATENT DOCUMENTS

| | | | |
|---|---|---|---|
| 2012/0155366 A1 | 6/2012 | Zirwas et al. | |
| 2013/0051240 A1 | 2/2013 | Bhattad et al. | |
| 2013/0344816 A1 | 12/2013 | Niu et al. | |
| 2014/0286291 A1* | 9/2014 | Einhaus et al. | H04B 7/024 370/329 |
| 2016/0128087 A1* | 5/2016 | Chen et al. | H04W 28/18 370/329 |
| 2016/0197654 A1* | 7/2016 | Zhang | H04B 7/024 370/329 |

OTHER PUBLICATIONS

3GPP TS 36213 V12.0.0; Technical Specification Group, Radio Access Network; Evolved Universal Terrestrial Radio, Access (E-UTRA); Physical layer procedures (Release 12), 201312.20, Sections 5.2, 5.2.1, 7.2, 7.2.1, 7.2.2, Dec. 20, 2013, 19 pages.
3GPP TS 36A23 V12.0.0; Technical Specification Group, Radio Access Network; Evolved Universal Terrestrial Radio, Access Network (E-UTRAN); X2 application protocol (X2AP), (Release 12) 20131219, Sections 1, 8.3, 1.2, Dec. 2013, Dec. 19, 2013, 20 pages.
International Search Report and Written Opinion for International Patent Application No. PCT/US2015/011516, mailed on Apr. 21, 2015, 9 pages.
3GPP TS 36.213 V12.0.0 (Dec. 2013); 3rd Generation Partnership Project; Technical Specification Group Radio Access Network; Evolved Universal Terrestrial Radio Access (E-UTRA); Physical layer procedures (Release 12); Dec. 2013; 186 pages.
3GPP TS 36.423 V12.0.0 (Dec. 2013); 3rd Generation Partnership Project; Technical Specification Group Radio Access Network; Evolved Universal Terrestrial Radio Access Network (E-UTRAN); X2 application protocol (X2AP) (Release 12); Dec. 2013; 81 pages.
International Preliminary Report on Patentability for PCT/US2015/011516, mailed on Aug. 11, 2016, 6 pages.
Office Action for Taiwanese Patent Application No. 104101171, mailed on Nov. 29, 2016, 9 pages (Including 5 pages of English translation).

* cited by examiner

APPARATUS, METHOD, AND SYSTEM OF INTER-NODE COMMUNICATION

CROSS REFERENCE

This application claims the benefit of and priority from U.S. Provisional Patent Application No. 61/933,859 entitled "Enhanced RNTP Signaling for DL COMP", filed Jan. 30, 2014, the entire disclosure of which is incorporated herein by reference.

TECHNICAL FIELD

Some embodiments described herein generally relate to inter-node communication.

BACKGROUND

In cellular networks, a cell may suffer co-channel interference from one or more neighboring cells. In some cases, the co-channel interference may be a dominant limiting factor for achieving higher network efficiency, for example, for cell edge users.

Downlink (DL) Coordinated Multi-Point (CoMP) schemes attempt to address the inter-cell interference, by using coordination schemes on a network side to coordinate between transmitting nodes. The DL CoMP schemes assume an Evolved Node B (eNB) architecture with multiple remote radio heads (RRH), a central processing unit, which is responsible for signal processing and coordination of RRHs, and ideal, e.g., high capacity and low latency, backhaul links to connect between the RRHs and the central processing unit. However, usage of the DL CoMP schemes may be limited to very specific deployments, since ideal or close-to-ideal backhaul links may not be available in many deployments.

Another attempt to mitigate inter-cell co-channel interference is based on frequency-domain Inter-Cell Interference Coordination (ICIC). For example, the frequency-domain ICIC may be used to assign different Transmit (TX) power levels to different subcarriers, and to allocate the subcarriers to User Equipment (UE) based on UE locations with respect to a cell edge. In one example, non-overlapping subcarriers across neighboring cells may be allocated to the cell edge UEs, and overlapping subcarriers may be simultaneously allocated to UEs located at centers of the cells. In another example different power levels may be used to prevent cell edge UEs, which are served by neighboring cells, from being affected by inter-cell interference.

The frequency-domain ICIC may be implemented by exchanging a Relative Narrowband TX Power indication (RNTP) signaling messages to provide an indication on DL power restriction per Physical Resource Block (PRB) in a cell.

However, the current RNTP signaling is limited to specific deployments, and is not able to support other deployments.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
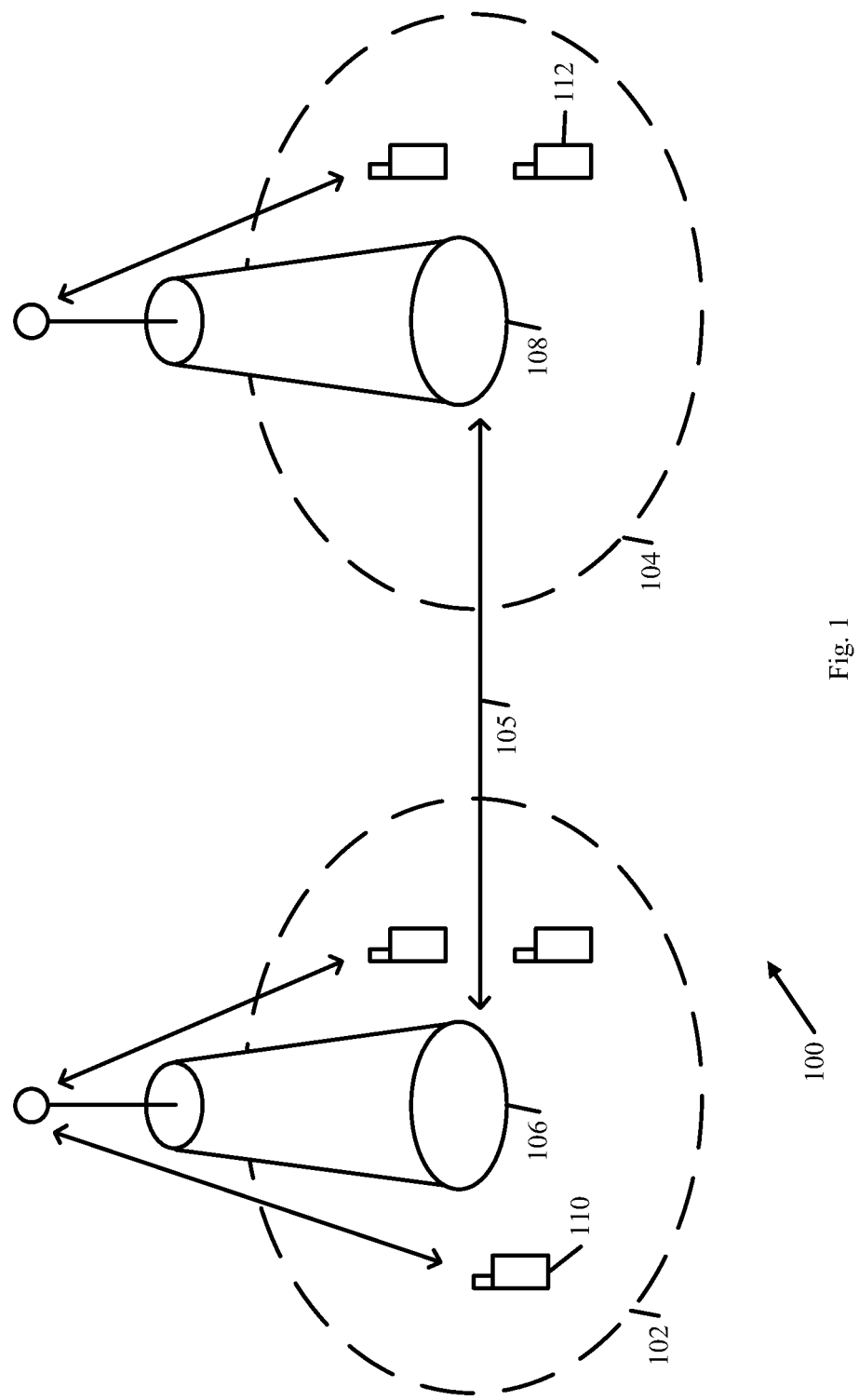
FIG. 1 is a schematic illustration of a cellular system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.423 (3GPP TS 36.423 V12.0.0 (2013-12); *Technical Specification; 3rd Generation Partnership Project; Technical Specification Group Radio Access Network; Evolved Universal Terrestrial Radio Access Network* (E-UTRAN); X2 *application protocol* (X2AP) (Release 12)), and/or 3GPP TS 36.213 (3GPP TS 36.213 V12.0.0 (2013-12); *Technical Specification; 3rd Generation Partnership Project; Technical Specification Group Radio Access Network; Evolved Universal Terrestrial Radio Access* (E-UTRA); *Physical layer procedures* (Release 12)))), and/or future versions and/or derivatives thereof, devices and/or networks operating in accordance with existing IEEE 802.16 standards (IEEE-Std 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMax cellular network, and the like.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a cellular system 100, in accordance with some demonstrative embodiments. In one example, cellular system 100 may include a $4^{th}$ generation cellular system such as, for example, a long term evolution (LTE) or LTE advance cellular system, a WiMAX cellular system, and the like. In other embodiments, system 100 may include any other cellular system.

As shown in FIG. 1, in some demonstrative embodiments, system 100 may include a plurality of cellular nodes, e.g., including cellular nodes 106 and 108, capable of communicating content, data, information and/or signals corresponding to a plurality of cells, e.g., including cells 102 and 104. For example, node 106 may communicate with a plurality of User Equipment (UE) devices 110 within cell 102 and/or node 108 may communicate with a plurality of UE devices 112 within cell 104.

In some demonstrative embodiments, nodes 106 and/or 108 may include an Evolved Node B (eNB). For example, nodes 106 and/or 108 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, nodes 106 and/or 108 may include any other functionality and/or may perform the functionality of any other cellular node, e.g., a Node B (NB), a Base Station (BS), and the like.

In some demonstrative embodiments, nodes 106 and 108 may communicate via one or more backhaul links, e.g., via a backhaul link 105.

In some demonstrative embodiments, nodes 106 and 108 may communicate via backhaul link 105 according to an X2 Application Protocol (X2AP) signaling protocol, e.g., as described below. In other embodiments, nodes 106 and 108 may communicate via backhaul link 105 according to any other signaling protocol.

In some demonstrative embodiments, backhaul link 105 may include a wireless link. In other embodiments, backhaul link 105 may include a wired link, a fiber link, or any combination of wired, fiber and/or wireless links.

In some demonstrative embodiments, UEs 110 and/or 112 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

Figure 2:
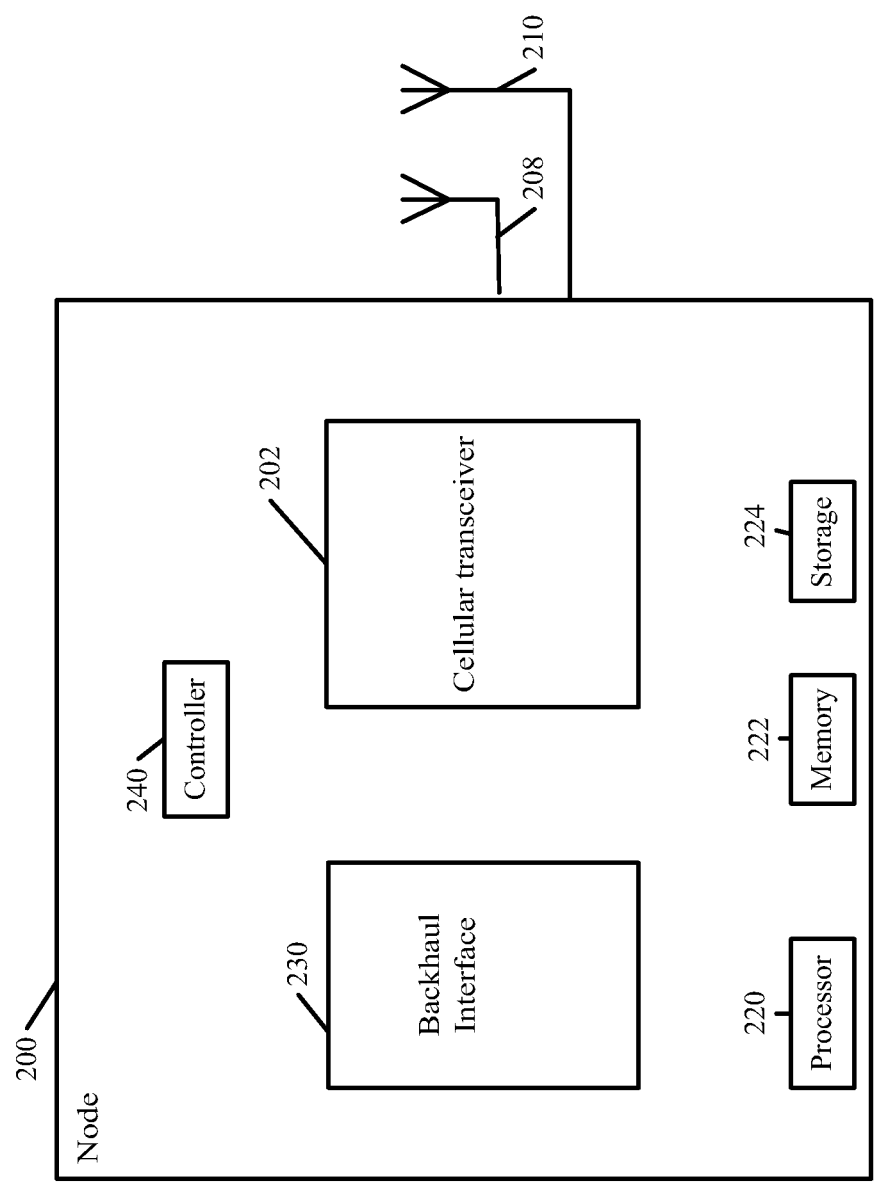
FIG. 2 is a schematic block diagram illustration of a cellular node, in accordance with some demonstrative embodiments.

Reference is made to FIG. 2, which schematically illustrates a cellular node 200, in accordance with some demonstrative embodiments. For example, cellular node 200 may perform the functionality of node 106 (FIG. 1) and/or node 108 (FIG. 1).

In some demonstrative embodiments, cellular node 200 may include an air interface, for example, a cellular transceiver (TRx) 202, configured to communicate with one or more UEs.

In some demonstrative embodiments, cellular TRx 202 may include one or more wireless transmitters, receivers and/or transceivers able to send and/or receive wireless communication signals, RF signals, frames, blocks, transmission streams, packets, messages, data items, and/or data.

In some demonstrative embodiments, cellular TRx 202 may include a multiple input multiple output (MIMO) transmitters receivers system (not shown), which may be capable of performing antenna beamforming methods, if desired. In other embodiments, cellular TRx 202 may include any other transmitters and/or receivers.

In some demonstrative embodiments, cellular TRx 202 may include LTE, WCDMA and/or TD-SCDMA modulators and/or demodulators (not shown) configured to communicate downlink signals over downlink channels, e.g., between node 200 and a UE, and uplink signals over uplink channels, e.g., between a UE and node 200. In other embodiments, cellular TRx 202 may include any other modulators and/or demodulators.

In some demonstrative embodiments, cellular TRx 202 may include a turbo decoder and/or a turbo encoder (not shown) for encoding and/or decoding data bits into data symbols, if desired. In some demonstrative embodiments, cellular TRx 202 may include OFDM and/or SC-FDMA modulators and/or demodulators (not shown) configured to communicate OFDM signals over the downlink (DL) channels, and/or SC-FDMA signals over the uplink (UL) channels.

In some demonstrative embodiments, node 200 may include, or may be associated with, one or more antennas. In one example, node 200 may be associated with at least two antennas, e.g., antennas 208 and 210. In another example, node 200 may be associated with one antenna or more than two antennas.

In some demonstrative embodiments, antennas 208 and/or 210 may include any type of antennas suitable for transmitting and/or receiving wireless communication signals, blocks, frames, transmission streams, packets, messages and/or data. For example, antennas 208 and/or 210 may include any suitable configuration, structure and/or arrangement of one or more antenna elements, components, units, assemblies and/or arrays. For example, antennas 208 and/or 210 may include a phased array antenna, a dipole antenna, a single element antenna, a set of switched beam antennas, and/or the like.

In some embodiments, antennas 208 and/or 210 may implement transmit and receive functionalities using separate transmit and receive antenna elements. In some embodiments, antennas 208 and/or 210 may implement transmit and receive functionalities using common and/or integrated transmit/receive elements.

In some demonstrative embodiments, node 200 may include a backhaul interface 230 to communicate between node 200 and one or more other nodes via a backhaul link. For example, backhaul interface 230 may communicate between nodes 106 (FIG. 1) and 108 (FIG. 1), e.g., via backhaul link 105 (FIG. 1).

In some demonstrative embodiments, backhaul interface 230 may include an X2AP interface. In other embodiments, backhaul interface 230 may include any other interface.

In some demonstrative embodiments, node 200 may include a controller 240 to control one or more functionalities of node 200 and/or to control one or more communications performed by node 200, for example, to control inter-node communications between nodes 106 and 108 (FIG. 1), to control communications between node 200 and one or more UEs, and/or to control communications between node 200 and one or more other network elements, e.g., as described below.

In some demonstrative embodiments, controller 240 may perform the functionality of a scheduler to schedule communications of a UE, e.g., as described below. For example, controller 240 may schedule communications of one or more UEs 110 (FIG. 1), e.g., if node 200 performs the functionality of node 106 (FIG. 1); or controller 240 may schedule communications of one or more UEs 112 (FIG. 1), e.g., if node 200 performs the functionality of node 108 (FIG. 1).

In some demonstrative embodiments, controller 240 may include or may be implemented using suitable circuitry, e.g., controller circuitry, scheduler circuitry, processor circuitry, memory circuitry, and/or any other circuitry, which may be configured to perform at least part of the functionality of controller 240. Additionally or alternatively, one or more functionalities of controller 240 may be implemented by logic, which may be executed by a machine and/or one or more processors, e.g., as described below.

In some demonstrative embodiments, cellular node 200 may include, for example, one or more of a processor 220, a memory unit 222, and a storage unit 224. In one example, one or more of processor, 220 memory 222 and/or storage 224 may be implemented as one or more elements separate from transceiver 202, and/or controller 240. In another example, one or more of processor, 220 memory 222 and/or storage 224 may be implemented as part of transceiver 202, and/or controller 240.

Processor 220 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 220 executes instructions, for example, of an Operating System (OS) of node 200 and/or of one or more suitable applications.

Memory unit 222 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 224 includes, for example, a hard disk drive, a floppy disk drive, a Compact Disk (CD) drive, a CD-ROM drive, a DVD drive, or other suitable removable or non-removable storage units. Memory unit 222 and/or storage unit 224, for example, may store data processed by node 200.

Referring back to FIG. 1, in some demonstrative embodiments nodes 106 and 108 to communicate inter-node communications, e.g., inter-node signaling messages, which may be configured, for example, to coordinate communications between cells 102 and 104, e.g., as described below.

In some demonstrative embodiments, the inter-node communications between nodes 106 and 108 may be configured, for example, to mitigate inter-cell interference between cells 102 and 104, e.g., as described below.

In some demonstrative embodiments, the inter-node communications between nodes 106 and 108 may be configured, for example, to facilitate improved, efficient, and/or flexible Downlink (DL) Coordinated Multi-Point (CoMP) schemes, e.g., as described below.

In some demonstrative embodiments, the inter-node communications between nodes 106 and 108 may be configured, for example, to enable coordination of scheduling and/or precoding settings (also referred to as "beamforming settings") between nodes 106 and 108, e.g., as described below.

In some demonstrative embodiments, nodes 106 and 108 may be configured to coordinate the scheduling and/or precoding setting using signaling messages communicated via backhaul link 105 between nodes 106 and 108, e.g., as described below.

In some demonstrative embodiments, the ability to communicating the signaling messages via backhaul link 105 between nodes 106 and 108 may enable, for example, utilizing a DL CoMP scheme in deployment scenarios, which may, for example, have non-ideal or sub-optimal backhaul links.

In some demonstrative embodiments, nodes 106 and 108 may be configured to communicate via backhaul link 105 one or more signaling messages including one or more precoding restriction settings, for example, in the form of a Codebook Subset Restriction (also referred to as "codebookSubsetRestriction") parameter, which may be configured to provide an indication of a precoding restriction in a cell. For example, the codebookSubsetRestriction may be configured to provide a precoding restriction per resource block, for example, per Physical Resource Block (PRB) or a wideband resource, e.g., as described below.

In some demonstrative embodiments, cellular TRx 202 (FIG. 2) of node 106 may communicate with UE 110 in cell 102.

In some demonstrative embodiments, controller 240 (FIG. 2) of node 106 may determine a precoding restriction setting, for example, based on downlink communications to the UE 110.

In some demonstrative embodiments, backhaul interface 230 (FIG. 2) of node 106 may send to node 108 a signaling message including the precoding restriction setting, e.g., via backhaul link 105, for example, as described below.

In some demonstrative embodiments, controller 240 (FIG. 2) of node 108 may schedule communications for one or more UEs 112 of cell 104, for example, based on the precoding restriction setting received from node 106, e.g., via backhaul link 105.

In some demonstrative embodiments, controller 240 (FIG. 2) of node 106 may determine the precoding restriction setting, for example, while taking into account a precoding restriction setting recommendation from node 108, e.g., as described below.

In some demonstrative embodiments, node 108 may receive Channel State Information from one or more UEs 112 of cell 104, and controller 240 (FIG. 2) of node 108 may determine the precoding restriction setting recommendation based on the CSI.

In some demonstrative embodiments, the CSI may include, for example, information relating to a Precoding Matrix indicator (PMI), a Channel Quality Indicator (CQI), a Rank Indicator (RI), Precoding Type Indicator (PTI), or any combination thereof. The CSI information may include information of any additional or alternative CSI-related parameter, e.g., corresponding to a channel between a node and a UE.

In some demonstrative embodiments, backhaul interface 230 (FIG. 2) of node 108 may send to node 106 a signaling message including the precoding restriction setting recommendation, e.g., via backhaul link 105, for example, as described below.

In some demonstrative embodiments, node 106 may send the precoding restriction setting, and/or node 108 may send the precoding restriction setting recommendation in the form of a beamforming restriction setting bitmap, which may be configured to indicate a restricted precoding parameter corresponding to a precoding codebook, e.g., as described below.

In some demonstrative embodiments, nodes 106 and 108 may communicate the precoding restriction setting and/or the precoding restriction setting recommendation in the form of a message including a codebookSubsetRestriction Information Element (IE), and a Number of CSI Reference Signals (CSI-RS) Antenna Ports IE, e.g., as described below.

In one example, nodes 106 and 108 may communicate the precoding restriction setting and/or the precoding restriction setting recommendation in the form of the following IEs:

TABLE 1

| IE/Group Name | Presence | IE type and reference | Semantics description | Criticality |
|---|---|---|---|---|
| . . . | | | | — |
| codebookSubsetRestriction | M | BIT STRING | codebookSubsetRestriction is defined in TS 36.331. | — |
| Number Of Channel State Information Reference Signals (CSI-RS) Antenna Ports | M | ENUMERATED (1, 2, 4, 8) | N (number of antenna ports for CSI-RS reference signals) defined in TS 36.211 | — |
| . . . | | | | — |

For example, the Number Of Channel State Information Reference Signals (CSI-RS) Antenna Ports IE may indicate a codebook to be used for precoding restrictions using the codebookSubsetRestriction.

In some demonstrative embodiments, the codebookSubsetRestriction IE may include, for example, a bitmap indicating a restricted precoding parameter corresponding to the codebook. The restricted precoding parameter may include, for example, a PMI, a RI, a PTI, or any other precoding parameter.

In some demonstrative embodiments, the bitmap may include, for example, an indication of a restriction on the precoding parameter. In one example, the bitmap may indicate a restriction on the PMI. According to this example, the bitmap may include a plurality of bits corresponding to a plurality of PMI values, e.g., according to the codebook. A bit corresponding to a PMI value may have, for example, a first value, e.g., "0", to indicate that the PMI value is to be restricted, or a second value, e.g., "1", to indicate that the PMI value is not to be restricted.

In some demonstrative embodiments, nodes 106 and 108 may communicate the precoding restriction setting and/or the precoding restriction setting recommendation to indicate precoding restrictions per two or more resources.

In one example, nodes 106 and 108 may communicate the precoding restriction setting and/or the precoding restriction setting recommendation to indicate precoding restrictions per resources of a frequency domain, for example, per PRB, per frequency sub-band, or per any other frequency-domain resource.

In another example, nodes 106 and 108 may communicate the precoding restriction setting and/or the precoding restriction setting recommendation to indicate precoding restrictions per resources of a time domain, for example, per an Almost Blank Subframe (ABS) pattern, or per any other time-domain resource.

In some demonstrative embodiments, nodes 106 and 108 may communicate the precoding restriction setting and/or the precoding restriction setting recommendation in the form of an X2AP message. For example, nodes 106 and 108 may communicate the X2AP message via backhaul link 105.

In some demonstrative embodiments, nodes 106 and 108 may communicate the precoding restriction setting and/or the precoding restriction setting recommendation as part of an X2AP Load Information message, e.g., described below. In other embodiments, nodes 106 and 108 may communicate the precoding restriction setting and/or the precoding restriction setting recommendation as part of any other X2AP message and/or as part of any other type of message.

In some demonstrative embodiments, nodes 106 and 108 may communicate a plurality of sets of Relative Narrowband Transmit (Tx) Power (RNTP) parameters, which may be configured to provide RNTP settings corresponding to a plurality of RNTP thresholds, e.g., as described below.

In some demonstrative embodiments, signaling the plurality of sets of RNTP parameters between nodes 106 and 108 may enable nodes 106 and 108 to provide one another with RNTP parameters at an increased level of granularity, which, in turn, may increase an efficiency and/or accuracy of coordination between nodes 106 and 108.

In some demonstrative embodiments, controller 240 (FIG. 2) of node 106 may determine a RNTP setting, for example, based on downlink communications to the UE 110.

In some demonstrative embodiments, backhaul interface 230 (FIG. 2) of node 106 may send to node 108 a signaling message including the RNTP setting, e.g., via backhaul link 105, for example, as described below.

In some demonstrative embodiments, controller 240 (FIG. 2) of node 108 may schedule communications for one or more UEs 112 of cell 104, for example, based on the RNTP setting received from node 106, e.g., via backhaul link 105.

In some demonstrative embodiments, controller 240 (FIG. 2) of node 106 may determine the RNTP setting, for example, while taking into account a RNTP setting recommendation from node 108, e.g., as described below.

In some demonstrative embodiments, controller 240 (FIG. 2) of node 108 may determine the RNTP setting recommendation based on the CSI from one or more of UEs 112.

In some demonstrative embodiments, backhaul interface 230 (FIG. 2) of node 108 may send to node 106 a signaling message including the RNTP setting recommendation, e.g., via backhaul link 105, for example, as described below.

In some demonstrative embodiments, the RNTP setting and/or the RNTP setting recommendation may include a plurality of RNTP bitmaps corresponding to a respective plurality of different RNTP thresholds, e.g., as described below.

In some demonstrative embodiments, an RNTP bitmap of the plurality of RNTP bitmaps may include a plurality of bits corresponding to a respective plurality of PRBs. For example, a bit corresponding to a PRB may have a value to indicate if a transmit power of the PRB is not to exceed an RNTP threshold corresponding to the RNTP bitmap, e.g., as described below.

In some demonstrative embodiments, nodes 106 and 108 may communicate the RNTP setting and/or the RNTP setting recommendation in the form of a message including an RNTP IE, e.g., as described below.

In one example, nodes 106 and 108 may communicate the RNTP setting and/or the RNTP setting recommendation including at least two RNTP bitmaps corresponding to two RNTP thresholds, e.g., as follows:

TABLE 2

| IE/Group Name | Presence | IE type and reference | Semantics description | Criticality |
|---|---|---|---|---|
| ... | | | | — |
| RNTP1 Per PRB | M | BIT STRING (6 ... 110, ...) | Each position in the bitmap represents a nPRB value (i.e. first bit = PRB 0 and so on), for which the bit value represents RNTP (nPRB), defined in TS 36.213 [11], Value 0 indicates "Tx not exceeding RNTP threshold". Value 1 indicates "no promise on the Tx power is given". | — |

TABLE 2-continued

| IE/Group Name | Presence | IE type and reference | Semantics description | Criticality |
|---|---|---|---|---|
| RNTP1 Threshold | M | ENUMERATED (−∞, −11, −10, −9, −8, −7, −6, −5, −4, −3, −2, −1, 0, 1, 2, 3, ...) | RNTPthreshold is defined in TS 36.213 [11]. | — |
| RNTP2 Per PRB | M | BIT STRING (6 ... 110, ...) | Each position in the bitmap represents a nPRB value (i.e. first bit = PRB 0 and so on), for which the bit value represents RNTP (nPRB), defined in TS 36.213 [11], Value 0 indicates "Tx not exceeding RNTP threshold". Value 1 indicates "no promise on the Tx power is given". | — |

TABLE 2-continued

| IE/Group Name | Presence | IE type and reference | Semantics description | Criticality |
|---|---|---|---|---|
| RNTP2 Threshold | M | ENUMERATED (−∞, −11, −10, −9, −8, −7, −6, −5, −4, −3, −2, −1, 0, 1, 2, 3, ...) | RNTPthreshold is defined in TS 36.213 [11]. | — |
| ... | | | | — | wherein the element RNTP1 Threshold includes a first RNTP threshold, the element RNTP1 per PRB includes a first RNTP bitmap corresponding to the first RNTP threshold, the element RNTP2 Threshold includes a second RNTP threshold, and the element RNTP2 per PRB includes a second RNTP bitmap corresponding to the second RNTP threshold.

In some demonstrative embodiments, an RNTP bitmap corresponding to a RNTP threshold may include a plurality of bits corresponding to a respective plurality of PRBs. For example, an RNTP bit value of the RNTP bitmap may indicate whether a corresponding PRB is limited by a transmit power threshold or not. In one example, an RNTP bit corresponding to a PRB may have either a first value, e.g., "0", to indicate that a transmit power corresponding to the PRB is not to exceed the RNTP threshold, or a second value, e.g., "1", to indicate no guarantee regarding the transmit power corresponding to the PRB.

In one example, an RNTP value, denoted $RNTP(n_{PRB})$, of the RNTP bit may have granularity of one PRB, e.g., as follows:

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_nom}^{(p)}} \text{ is made} \end{cases} \quad (1)$$

wherein $E_A(n_{PRB})$ denotes a maximum intended Energy Per Resource Element (EPRE) of UE-specific Physical Downlink Shared Channel (PDSCH) Resource Elements (REs) in OFDM symbols not containing RS in a physical resource block on an antenna port, denoted p, in a considered future time interval; $n_{PRB}$ denotes a physical resource block number $n_{PRB}=0, \ldots, N_{RB}^{DL}-1$; and $RNTP_{threshold}$ denotes the RNTP threshold, e.g., a value selected from $RNTP_{threshold} \in \{-\infty,-11,-10,-9,-8,-7,-6,-5,-4,-3,-2,-1,0,+1,+2,+3\}[dB]$, wherein:

$$E_{max\_nom}^{(p)} = \frac{P_{max}^{(p)} \cdot \frac{1}{\Delta f}}{N_{RB}^{DL} \cdot N_{SC}^{RB}} \quad (2)$$

wherein $P_{max}^{(p)}$ is a base station maximum output power, and $\Delta f$, $N_{RB}^{DL}$ and $N_{SC}^{RB}$ include parameters, e.g., defined, for example, in 3GPP TS 36.211 (3GPP TS 36.211 V12.0.0 (2013-12); Technical Specification; 3rd Generation Partnership Project; Technical Specification Group Radio Access Network; Evolved Universal Terrestrial Radio Access (E-UTRA); Physical channels and modulation (Release 12)).

In other embodiments, the RNTP bitmap may be defined according to any other scheme, and/or values.

In some demonstrative embodiments, the plurality of RNTP bitmaps may enable communicating between nodes 106 and 108 RNTP information at an increased level of granularity. For example, using the first and second RNTP bitmaps may enable to indicate, for a PRB, whether the transmit power corresponding to the PRB is to be below a first threshold, whether the transmit power corresponding to the PRB is to be between the first and second thresholds, or whether the transmit power corresponding to the PRB is not guaranteed to be below he second threshold.

In another example, the RNTP setting and/or the RNTP setting recommendation may include more than two RNTP bitmaps corresponding to more than two RNTP thresholds, e.g., three or more RNTP bitmaps corresponding to three or more RNTP thresholds.

In some demonstrative embodiments, nodes 106 and 108 may communicate the RNTP setting and/or the RNTP setting recommendation in the form of an X2AP message. For example, nodes 106 and 108 may communicate the X2AP message via backhaul link 105.

In some demonstrative embodiments, nodes 106 and 108 may communicate the RNTP setting and/or the RNTP setting recommendation as part of an X2AP Load Information message, e.g., described below. In other embodiments, nodes 106 and 108 may communicate the RNTP setting and/or the RNTP setting recommendation as part of any other X2AP message and/or as part of any other type of message.

In some demonstrative embodiments, nodes 106 and 108 may communicate via backhaul link 105 one or more signaling messages to indicate restrictions, e.g., power setting restrictions, in a time domain, e.g., as described below.

In some demonstrative embodiments, nodes 106 and 108 may communicate via backhaul link 105 one or more signaling messages including a Relative Wideband Transmit Power (RWTP) setting, e.g., as described below.

In some demonstrative embodiments, signaling the RWTP setting between nodes 106 and 108 may enable nodes 106 and 108 to provide one another with transmit power restrictions in the time domain, which, in turn, may increase an efficiency and/or accuracy of coordination between nodes 106 and 108, e.g., with respect to resource usage in the time domain.

In some demonstrative embodiments, controller 240 (FIG. 2) of node 106 may determine a RWTP setting, for example, based on downlink communications to the UE 110.

In some demonstrative embodiments, backhaul interface 230 (FIG. 2) of node 106 may send to node 108 a signaling message including the RWTP setting, e.g., via backhaul link 105, for example, as described below.

In some demonstrative embodiments, controller 240 (FIG. 2) of node 108 may schedule communications for one or more UEs 112 of cell 104, for example, based on the RWTP setting received from node 106, e.g., via backhaul link 105.

In some demonstrative embodiments, controller 240 (FIG. 2) of node 106 may determine the RWTP setting, for example, while taking into account a RWTP setting recommendation from node 108, e.g., as described below.

In some demonstrative embodiments, controller 240 (FIG. 2) of node 108 may determine the RWTP setting recommendation based on the CSI from one or more of UEs 112.

In some demonstrative embodiments, backhaul interface 230 (FIG. 2) of node 108 may send to node 106 a signaling message including the RWTP setting recommendation, e.g., via backhaul link 105, for example, as described below.

In some demonstrative embodiments, the RWTP setting and/or the RWTP setting recommendation may include at least one RWTP bitmap corresponding to at least one respective different RWTP threshold, e.g., as described below.

In some demonstrative embodiments, the RWTP bitmap may include a plurality of bits corresponding to a respective plurality of time domain resource elements, e.g., a plurality of time slots ("slots"), a plurality of sub-frames, and/or any other time domain resources.

For example, a bit corresponding to a time domain resource element may have a value to indicate if a transmit power of the time domain resource element is not to exceed the RWTP threshold corresponding to the RWTP bitmap, e.g., as described below.

In some demonstrative embodiments, nodes 106 and 108 may communicate the RWTP setting and/or the RWTP setting recommendation in the form of a message including an RWTP IE, e.g., as described below.

In some demonstrative embodiments, nodes 106 and 108 may communicate the RWTP setting and/or the RWTP setting recommendation including at least one RWTP bitmaps corresponding to at least one RWTP threshold.

In one example, nodes 106 and 108 may communicate the RWTP setting and/or the RWTP setting recommendation with respect to a plurality of slots, e.g., as follows:

TABLE 3

| IE/Group Name | Presence | IE type and reference | Semantics description | Criticality |
|---|---|---|---|---|
| ... | | | | — |
| RWTP Per Slot | M | BIT STRING (20) | Each position in the bitmap represents a slot value (i.e. first bit = slot 0 and so on), for which the bit value represents RWTP (nS), defined in TS 36.213 [11]. Value 0 indicates "Tx not exceeding RWTP threshold". Value 1 indicates "no promise on the Tx power is given". | — |
| RWTP Threshold | M | ENUMERATED (−∞, −11, −10, −9, −8, −7, −6, −5, −4, −3, −2, −1, 0, 1, 2, 3, ... ) | RWTPthreshold is defined in TS 36.213 [11], | — |
| ... | | | | — | wherein the element RWTP Threshold includes a RWTP threshold, and the element RWTP per slot includes RWTP bitmap corresponding to the RWTP threshold.

In some demonstrative embodiments, an RWTP bitmap corresponding to a RWTP threshold may include a plurality of bits corresponding to a respective plurality of time domain resources, e.g., slots. For example, an RWTP bit value of the RWTP bitmap may indicate whether a corresponding slot is limited by a transmit power threshold or not. In one example, an RWTP bit corresponding to a slot may have either a first value, e.g., "0", to indicate that a transmit power corresponding to the slot is not to exceed the RWTP threshold, or a second value, e.g., "1", to indicate no guarantee regarding the transmit power corresponding to the slot.

In one example, an RWTP value, denoted RWTP($n_S$), of the RWTP bit may have granularity of one slot, e.g., as follows:

$$RWTP(n_S) = \begin{cases} 0 & \text{if } \frac{E_A(n_S)}{E_{max\_nom(S)}^{(p)}} \leq RWTP_{threshold} \\ 1 & \text{if no promise about the upper limit of } \frac{E_A(n_S)}{E_{max\_nom(S)}^{(p)}} \text{ is made} \end{cases} \quad (3)$$

wherein $E_A$ ($n_S$) denotes a maximum intended Energy Per Resource Element (EPRE) of UE-specific PDSCH Resource Elements (REs) in OFDM symbols not containing RS in a slot, denoted S, on the antenna port p, in a considered future time interval; $n_S$ denotes a slot number, e.g., $n_S$=0, . . . , 19, or any other number of slots; and $RWTP_{threshold}$ denotes the RWTP threshold, e.g., a value selected from $RWTP_{threshold} \in \{-\infty,-11,-10,-9,-8,-7,-6,-5,-4,-3,-2,-1, 0,+1,+2,\pm 3\}$[dB], wherein:

$$E_{max\_nom(S)}^{(p)} = P_{max}^{(p)} \quad (4)$$

In other embodiments, the RWTP bitmap may be defined according to any other scheme, and/or values.

In other embodiments, the RWTP setting may be defined with respect to any other time domain resource.

In one example, the RWTP setting may be defined per subframe. According to this example, the RWTP setting may be communicated according to Table 3, for example, if $n_S$ denotes a subframe number $n_S$=0, . . . , 9, e.g., for ten subframes, or any other number of subframes. For example, the RWTP bitmap may include a bit string of length 10, e.g., corresponding to the ten sub frames $n_S$.

In some demonstrative embodiments, the number of bits allocated for the RWTP bitmap may be set in accordance with a number of downlink subframes of an UL/DL Time Division Duplexing (TDD) configuration used in a given cell, e.g., if the RWTP setting is not to be applicable to uplink subframes for the TDD configuration.

In some demonstrative embodiments, the RWTP setting and/or the RWTP setting recommendation may include a plurality of RWTP bitmaps corresponding to a respective plurality of different RWTP thresholds.

In one example, the RWTP setting and/or the RWTP setting recommendation may include at least two RWTP bitmaps corresponding to at least two RWTP thresholds, e.g., a first RWTP bitmap corresponding to a first RWTP threshold, and a second RWTP bitmap corresponding to a second RWTP threshold.

In some demonstrative embodiments, the plurality of RWTP bitmaps may enable communicating between nodes 106 and 108 RWTP information at an increased level of granularity. For example, using the first and second RWTP bitmaps may enable to indicate, for a time domain resource, e.g., a slot or a subframe, whether the transmit power corresponding to the time domain resource is to be below the first RWTP threshold, whether the transmit power corresponding to the time domain resource is to be between the first and second RWTP thresholds, or whether the transmit power corresponding to the time domain resource is not guaranteed to be below the second RWTP threshold.

In some demonstrative embodiments, the RWTP setting may be communicated between nodes 106 and 108 using one or more RNTP parameter sets. For example, one or more RNTP per PRB bitmaps corresponding to one or more respective RNTP thresholds may be signaled by node 106 and/or node 108, for example for each time domain resource, e.g., for each subframe within a frame, to indicate different configurations of power allocation restrictions in the time domain.

In some demonstrative embodiments, nodes 106 and 108 may communicate the RWTP setting and/or the RWTP setting recommendation in the form of an X2AP message. For example, nodes 106 and 108 may communicate the X2AP message via backhaul link 105.

In some demonstrative embodiments, nodes 106 and 108 may communicate the RWTP setting and/or the RWTP setting recommendation as part of an X2AP message, e.g., described below. In other embodiments, nodes 106 and 108 may communicate the RWTP setting and/or the RWTP setting recommendation as part of any other X2AP message and/or as part of any other type of message.

In some demonstrative embodiments, nodes 106 and 108 may communicate one or more restriction settings via an X2AP message. For example, node 106 may send to node 108, e.g., via backhaul link 105, an X2AP message including the precoding restriction setting, the RNTP setting, and/or the RWTP setting; and/or node 108 may send to node 106, e.g., via backhaul link 105, an X2AP message including the precoding restriction setting recommendation, the RNTP setting recommendation, and/or the RWTP setting recommendation.

In some demonstrative embodiments, nodes 106 and 108 may communicate the precoding restriction setting and/or recommendation, the RNTP setting and/or recommendation, and/or the RWTP setting and/or recommendation via an X2AP Load Information message, e.g., as follows:

Direction: $eNB_1 \rightarrow eNB_2$.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |

TABLE 4-continued

| IE/Group Name | Presence | Range | IE type and reference | Semantics description | Criticality | Assigned Criticality |
|---|---|---|---|---|---|---|
| >Cell Information Item | | 1 ... <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 ... <maxCellineNB> | | | — | — |
| >>>Target Cell ID | M | | ECGI 9.2.14 | Id of the cell for which the HII is meant | — | — |
| >>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |
| >>CodebookSubsetRestriction | O | | | | — | |
| >>Relative Narrowband Tx Power 2 (RNTP2) | O | | | | — | |
| >>Relative Wideband Transmit Power (RWTP) | O | | | | — | |

In some demonstrative embodiments, a firs node ("the victim node"), e.g., node 108, which may serve one or more UEs ("the victim UEs"), e.g., cell edge UEs, subject to interference from a second node ("the interfering node"), e.g., node 106. The victim node may send one or more recommended restriction settings, e.g., the precoding restriction recommendation, the RNTP setting recommendation, and/or the RWTP setting recommendation to the interfering node, e.g., via backhaul link 105. For example, node 108 may determine the precoding restriction recommendation, the RNTP setting recommendation, and/or the RWTP setting recommendation, based on the CSI from the victim UEs, e.g., as described above. The interfering node may determine one or more restriction settings, e.g., the precoding restriction, the RNTP setting, and/or the RWTP setting, and may send the restriction settings to the victim node, e.g., via backhaul link 105.

Figure 3:
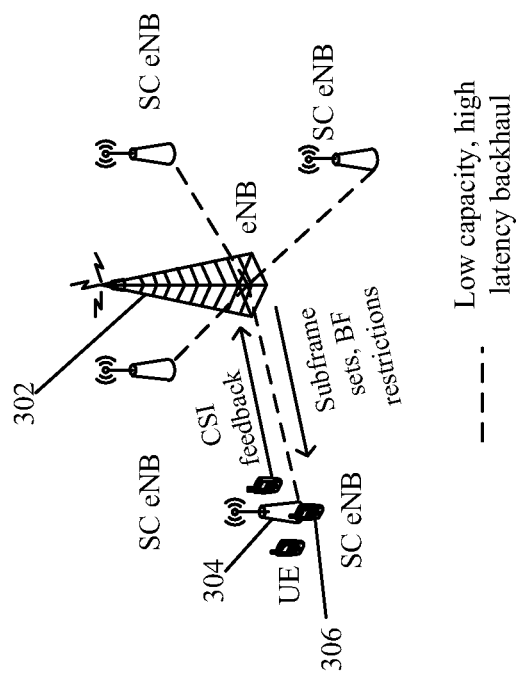
FIG. 3 is a schematic illustration of a Heterogeneous Network (HetNet) deployment, in accordance with some demonstrative embodiments.

Reference is made to FIG. 3, which schematically illustrates a HetNet deployment including a macro eNB 302 and a plurality of small cell (SC) eNBs 304, in accordance with some demonstrative embodiments. In one example, macro eNB 302 may perform the functionality of node 106 (FIG. 1), and/or small cell eNB 304 may perform the functionality of node 108 (FIG. 1).

In some demonstrative embodiments, macro eNB 302 may be configured to perform interference avoidance in a spatial domain towards one or more UEs 306, e.g., cell-edge UEs, of a neighboring small cell eNB 304, e.g., based on CSI feedback corresponding to interfering channels.

In some demonstrative embodiments, macro eNB 302 may inform small cell eNB 304 of one or more restriction settings, for example, a precoding restriction setting, a RNTP setting, and/or a RWTP setting, e.g., as described above.

In some demonstrative embodiments, small cell eNB 304 may perform user scheduling, e.g., to schedule communications of UEs 306, for example, by considering the restriction setting from macro cell 302, e.g., on specific time and/or frequency resources.

In one example, macro eNB 302 may restrict use of certain PMIs on specific time frequency resources, e.g., PMIs, which may create the high interference to the cell-edge UEs 306 of the neighboring cells. Small cell eNB 304 may schedule the cell-edge UE 306 on the time and/or frequency resources, for example, in accordance with the restriction settings, e.g., to avoid the interference.

In another example, small cell node 304 may determine recommended precoding restriction, RNTP, and/or RWTP settings, and small cell node 304 may signal recommended precoding restriction, RNTP, and/or RWTP settings to macro eNB 302, as recommendation for interference coordination, e.g., as described above. Macro eNB 302 may respond to small cell eNB 304 with restriction setting decisions on some or all time and/or frequency resources, e.g., as described above.

Figure 4:
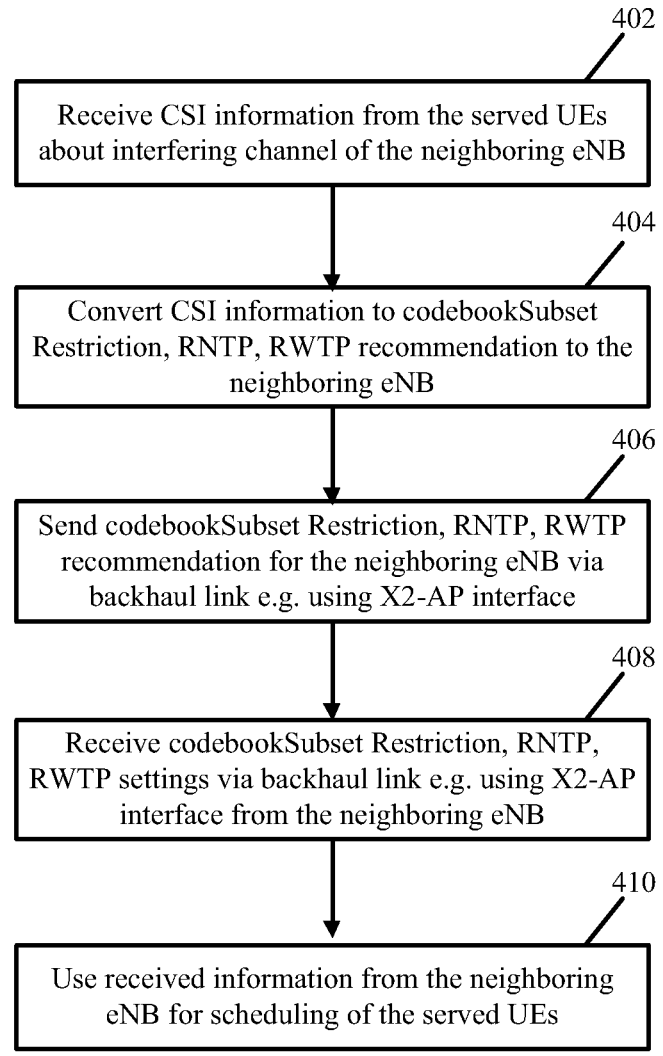
FIG. 4 is a schematic flow-chart illustration of a method of inter-node communication, in accordance with some demonstrative embodiments.

FIG. 4 is a schematic flow-chart illustration of a method of inter-node communication, in accordance with some demonstrative embodiments. In some demonstrative embodiments, one or more operations of the method of FIG. 4 may be performed at a first node, e.g., node 108 (FIG. 1).

As indicated at block 402, the method may include receiving CSI from one or more UEs, e.g., with respect to one or more channels ("the interfering channels") suffering interference from a second node. For example, node 108 (FIG. 1) may receive from UEs 112 (FIG. 1) CSI corresponding to one or more channels, which may suffer interference from node 106 (FIG. 1), e.g., as described above.

As indicated at block 404, the method may include determining one or more restriction recommendations, e.g., based on the CSI. For example, controller 240 (FIG. 2) of node 108 (FIG. 1) may determine a precoding restriction recommendation, a RNTP setting recommendation, and/or a RWTP setting recommendation, e.g., as described above.

As indicated at block 406, the method may include sending to the second node at least one signaling message including the one or more restriction recommendations, e.g., via a backhaul link. For example, node 108 (FIG. 1) may send to node 106 (FIG. 1), e.g., via backhaul ink 105 (FIG. 1), one or more X2AP messages including the precoding restriction recommendation, the RNTP setting recommendation, and/or the RWTP setting recommendation, e.g., as described above.

As indicated at block 408, the method may include receiving from the second node at least one signaling message including one or more restriction settings, e.g., via a backhaul link. For example, node 108 (FIG. 1) may receive from node 106 (FIG. 1), e.g., via backhaul ink 105 (FIG. 1), one or more X2AP messages including the precoding restriction setting, the RNTP setting, and/or the RWTP setting, e.g., as described above.

As indicated at block 410, the method may include scheduling communications for the UEs based on the one or more restriction settings. For example, controller 240 (FIG. 2) of node 108 (FIG. 1) may schedule communications for UEs 112 (FIG. 1), based on the precoding restriction setting, the RNTP setting, and/or the RWTP setting, e.g., as described above.

Figure 5:
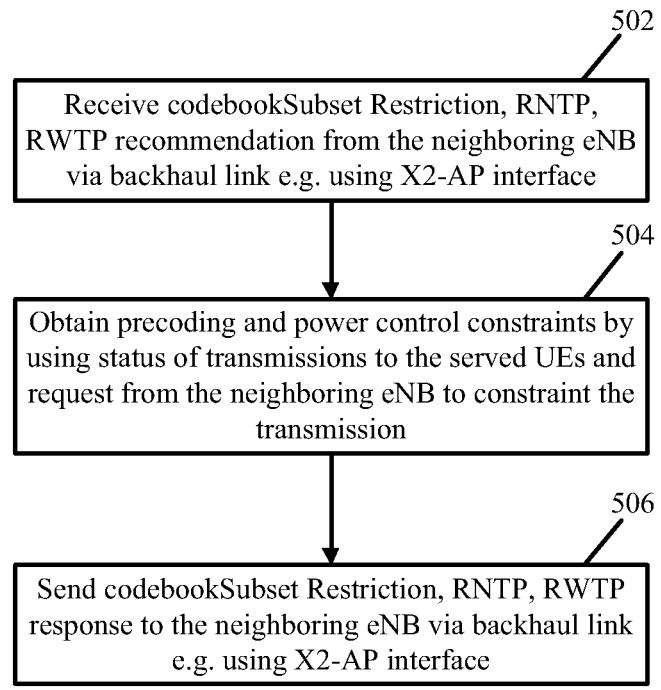
FIG. 5 is a schematic flow-chart illustration of a method of inter-node communication, in accordance with some demonstrative embodiments.

FIG. 5 is a schematic flow-chart illustration of a method of inter-node communication, in accordance with some demonstrative embodiments. In some demonstrative embodiments, one or more operations of the method of FIG. 5 may be performed at a first node, e.g., node 106 (FIG. 1).

As indicated at block 502, the method may include receiving from a second node at least one signaling message including one or more restriction recommendations, e.g., via a backhaul link. For example, node 106 (FIG. 1) may receive from node 108 (FIG. 1), e.g., via backhaul link 105 (FIG. 1), one or more X2AP messages including the precoding restriction recommendation, the RNTP setting recommendation, and/or the RWTP setting recommendation, e.g., as described above.

As indicated at block 504, the method may include determining one or more restriction settings, e.g., based on the one or more restriction recommendations. For example, controller 240 (FIG. 2) of node 106 (FIG. 1) may determine a precoding restriction setting, a RNTP setting, and/or a RWTP setting, e.g., as described above. In one example, controller 240 (FIG. 2) of node 106 (FIG. 1) may determine one or more restriction settings, for example, using status of transmissions to one or more of UEs 112 (FIG. 1), which may also be served by node 106 (FIG. 1), for example, while taking into consideration the one or more restriction recommendations, e.g., as described above.

As indicated at block 506, the method may include sending to the second node at least one signaling message including the one or more restriction settings, e.g., via a backhaul link. For example, node 106 (FIG. 1) may send to node 108 (FIG. 1), e.g., via backhaul ink 105 (FIG. 1), one or more X2AP messages including the precoding restriction setting, the RNTP setting, and/or the RWTP setting, e.g., as described above.

Figure 6:
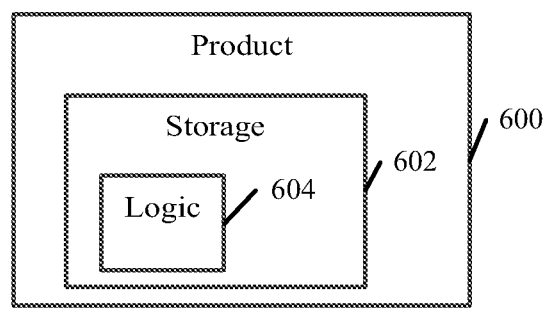
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of a node, e.g., node 106 (FIG. 1), node 108 (FIG. 1), node 200 (FIG. 2), node 302 (FIG. 3), and/or node 304 (FIG. 3); and/or a controller, e.g., controller 240 (FIG. 2); and/or to perform one or more operations of the methods of FIG. 4 and/or FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an Evolved Node B (eNB) comprising a cellular transceiver to communicate with a User Equipment (UE); a backhaul interface to receive a precoding restriction setting from another eNB via a backhaul link; and a controller to schedule communications of the UE based on the precoding restriction setting.

Example 2 includes the subject matter of Example 1, and optionally, wherein the backhaul interface is to send to the another eNB a precoding restriction recommendation.

Example 3 includes the subject matter of Example 2, and optionally, wherein the cellular transceiver is to receive Channel State Information (CSI) from the UE, the controller to determine the precoding restriction recommendation based on the CSI.

Example 4 includes the subject matter of any one of Examples 1-3, and optionally, wherein the precoding restriction setting comprises a bitmap indicating a restricted precoding parameter corresponding to a precoding codebook.

Example 5 includes the subject matter of any one of Examples 1-4, and optionally, wherein the precoding restriction setting comprises a CodebookSubsetRestriction Information Element (IE) and a Number Of CSI Reference Signals (CSI-RS) Antenna Ports IE.

Example 6 includes the subject matter of any one of Examples 1-5, and optionally, wherein the backhaul interface comprises an X2 Application Protocol (X2-AP) interface.

Example 7 includes the subject matter of Example 6, and optionally, wherein the backhaul interface is to receive an X2 load information message including the precoding restriction setting.

Example 8 includes the subject matter of any one of Examples 1-7, and optionally, comprising one or more antennas; a memory and a processor.

Example 9 includes an Evolved Node B (eNB) comprising a cellular transceiver to communicate with a User Equipment (UE); a backhaul interface to receive a Relative Narrowband Transmit (Tx) Power (RNTP) setting from another eNB via a backhaul link, the RNTP setting comprising a plurality of RNTP bitmaps corresponding to respective plurality of different RNTP thresholds; and a controller to schedule communications of the UE based on the RNTP setting.

Example 10 includes the subject matter of Example 9, and optionally, wherein the backhaul interface is to send to the another eNB an RNTP recommendation.

Example 11 includes the subject matter of Example 10, and optionally, wherein the cellular transceiver is to receive Channel State Information (CSI) from the UE, the controller to determine the RNTP recommendation based on the CSI.

Example 12 includes the subject matter of any one of Examples 9-11, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 13 includes the subject matter of any one of Examples 9-12, and optionally, wherein the backhaul interface comprises an X2 Application Protocol (X2-AP) interface.

Example 14 includes the subject matter of Example 13, and optionally, wherein the backhaul interface is to receive an X2 load information message including the RNTP setting.

Example 15 includes the subject matter of any one of Examples 9-14, and optionally, comprising one or more antennas; a memory and a processor.

Example 16 includes an Evolved Node B (eNB) comprising a cellular transceiver to communicate with a User Equipment (UE); a backhaul interface to receive a Relative Wideband Transmit (Tx) Power (RWTP) setting from another eNB via a backhaul link, the RWTP setting comprising at least one RWTP bitmap corresponding to at least one respective RWTP threshold; and a controller to schedule communications of the UE based on the RWTP setting.

Example 17 includes the subject matter of Example 16, and optionally, wherein the backhaul interface is to send to the another eNB an RWTP recommendation.

Example 18 includes the subject matter of Example 17, and optionally, wherein the cellular transceiver is to receive Channel State Information (CSI) from the UE, the controller to determine the RWTP recommendation based on the CSI.

Example 19 includes the subject matter of any one of Examples 16-18, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 20 includes the subject matter of any one of Examples 16-19, and optionally, wherein the RWTP setting includes a plurality of RWTP bitmaps corresponding a respective plurality of RWTP thresholds.

Example 21 includes the subject matter of any one of Examples 16-20, and optionally, wherein the backhaul interface comprises an X2 Application Protocol (X2-AP) interface.

Example 22 includes the subject matter of Example 21, and optionally, wherein the backhaul interface is to receive an X2 load information message including the RWTP setting.

Example 23 includes the subject matter of any one of Examples 16-22, and optionally, comprising one or more antennas; a memory and a processor.

Example 24 includes an Evolved Node B (eNB) comprising a cellular transceiver to communicate with a User Equipment (UE); a controller to determine a precoding restriction setting based on downlink communications to the UE; and a backhaul interface to send the precoding restriction setting to another eNB via a backhaul link.

Example 25 includes the subject matter of Example 24, and optionally, wherein the backhaul interface is to receive a precoding restriction recommendation from the another eNB, the controller to determine the precoding restriction setting based on the precoding restriction recommendation.

Example 26 includes the subject matter of Example 24 or 25, and optionally, wherein the precoding restriction setting comprises a bitmap indicating a restricted precoding parameter corresponding to a precoding codebook.

Example 27 includes the subject matter of any one of Examples 24-26, and optionally, wherein the precoding restriction setting comprises a CodebookSubsetRestriction Information Element (IE) and a Number Of CSI Reference Signals (CSI-RS) Antenna Ports IE.

Example 28 includes the subject matter of any one of Examples 24-27, and optionally, wherein the backhaul interface comprises an X2 Application Protocol (X2-AP) interface.

Example 29 includes the subject matter of Example 28, and optionally, wherein the backhaul interface is to send an X2 load information message including the precoding restriction setting.

Example 30 includes the subject matter of any one of Examples 24-29, and optionally, comprising one or more antennas; a memory and a processor.

Example 31 includes an Evolved Node B (eNB) comprising a cellular transceiver to communicate with a User Equipment (UE); a controller to determine a Relative Narrowband Transmit (Tx) Power (RNTP) setting based on downlink communications to the UE, the RNTP setting comprising a plurality of RNTP bitmaps corresponding to respective plurality of different RNTP thresholds; and a backhaul interface to send the RNTP setting to another eNB via a backhaul link.

Example 32 includes the subject matter of Example 31, and optionally, wherein the backhaul interface is to receive an RNTP recommendation from the another eNB, the controller to determine the RNTP setting based on the RNTP recommendation.

Example 33 includes the subject matter of Example 31 or 32, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 34 includes the subject matter of any one of Examples 31-33, and optionally, wherein the backhaul interface comprises an X2 Application Protocol (X2-AP) interface.

Example 35 includes the subject matter of Example 34, and optionally, wherein the backhaul interface is to send an X2 load information message including the RNTP setting.

Example 36 includes the subject matter of any one of Examples 31-35, and optionally, comprising one or more antennas; a memory and a processor.

Example 37 includes an Evolved Node B (eNB) comprising a cellular transceiver to communicate with a User Equipment (UE); a controller to determine a Relative Wideband Transmit (Tx) Power (RWTP) setting based on downlink communications to the UE, the RWTP setting comprising at least one RWTP bitmap corresponding to at least one respective RWTP threshold; and a backhaul interface to send the RWTP setting to another eNB via a backhaul link.

Example 38 includes the subject matter of Example 37, and optionally, wherein the backhaul interface is to receive an RWTP recommendation from the another eNB, the controller to determine the RWTP setting based on the RWTP recommendation.

Example 39 includes the subject matter of Example 37 or 38, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 40 includes the subject matter of any one of Examples 37-39, and optionally, wherein the RWTP setting includes a plurality of RWTP bitmaps corresponding a respective plurality of RWTP thresholds.

Example 41 includes the subject matter of any one of Examples 37-40, and optionally, wherein the backhaul interface comprises an X2 Application Protocol (X2-AP) interface.

Example 42 includes the subject matter of Example 41, and optionally, wherein the backhaul interface is to send an X2 load information message including the RWTP setting.

Example 43 includes the subject matter of any one of Examples 37-42, and optionally, comprising one or more antennas; a memory and a processor.

Example 44 includes a method to be performed at an Evolved Node B (eNB), the method comprising communicating with a User Equipment (UE); receiving a precoding restriction setting from another eNB via a backhaul link; and scheduling communications of the UE based on the precoding restriction setting.

Example 45 includes the subject matter of Example 44, and optionally, comprising sending to the another eNB a precoding restriction recommendation.

Example 46 includes the subject matter of Example 45, and optionally, comprising receiving Channel State Information (CSI) from the UE, and determining the precoding restriction recommendation based on the CSI.

Example 47 includes the subject matter of any one of Examples 44-46, and optionally, wherein the precoding restriction setting comprises a bitmap indicating a restricted precoding parameter corresponding to a precoding codebook.

Example 48 includes the subject matter of any one of Examples 44-47, and optionally, wherein the precoding restriction setting comprises a CodebookSubsetRestriction Information Element (IE) and a Number Of CSI Reference Signals (CSI-RS) Antenna Ports IE.

Example 49 includes the subject matter of any one of Examples 44-48, and optionally, wherein the backhaul link comprises a X2 Application Protocol (X2-AP) link.

Example 50 includes the subject matter of Example 49, and optionally, comprising receiving an X2 load information message including the precoding restriction setting.

Example 51 includes a method to be performed at an Evolved Node B (eNB), the method comprising communicating with a User Equipment (UE); receiving a Relative Narrowband Transmit (Tx) Power (RNTP) setting from another eNB via a backhaul link, the RNTP setting comprising a plurality of RNTP bitmaps corresponding to respective plurality of different RNTP thresholds; and scheduling communications of the UE based on the RNTP setting.

Example 52 includes the subject matter of Example 51, and optionally, comprising sending to the another eNB an RNTP recommendation.

Example 53 includes the subject matter of Example 52, and optionally, comprising receiving Channel State Information (CSI) from the UE, and determining the RNTP recommendation based on the CSI.

Example 54 includes the subject matter of any one of Examples 51-53, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 55 includes the subject matter of any one of Examples 51-54, and optionally, wherein the backhaul link comprises an X2 Application Protocol (X2-AP) link.

Example 56 includes the subject matter of Example 55, and optionally, comprising receiving an X2 load information message including the RNTP setting.

Example 57 includes a method to be performed at an Evolved Node B (eNB), the method comprising communicating with a User Equipment (UE); receiving a Relative Wideband Transmit (Tx) Power (RWTP) setting from another eNB via a backhaul link, the RWTP setting comprising at least one RWTP bitmap corresponding to at least one respective RWTP threshold; and scheduling communications of the UE based on the RWTP setting.

Example 58 includes the subject matter of Example 57, and optionally, comprising sending to the another eNB an RWTP recommendation.

Example 59 includes the subject matter of Example 58, and optionally, comprising receiving Channel State Information (CSI) from the UE, and determining the RWTP recommendation based on the CSI.

Example 60 includes the subject matter of any one of Examples 57-59, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 61 includes the subject matter of any one of Examples 57-60, and optionally, wherein the RWTP setting includes a plurality of RWTP bitmaps corresponding a respective plurality of RWTP thresholds.

Example 62 includes the subject matter of any one of Examples 57-61, and optionally, wherein the backhaul link comprises an X2 Application Protocol (X2-AP) link.

Example 63 includes the subject matter of Example 62, and optionally, comprising receiving an X2 load information message including the RWTP setting.

Example 64 includes a method to be performed at an Evolved Node B (eNB), the method comprising communicating with a User Equipment (UE); determining a precoding restriction setting based on downlink communications to the UE; and sending the precoding restriction setting to another eNB via a backhaul link.

Example 65 includes the subject matter of Example 64, and optionally, comprising receiving a precoding restriction recommendation from the another eNB, and determining the precoding restriction setting based on the precoding restriction recommendation.

Example 66 includes the subject matter of Example 64 or 65, and optionally, wherein the precoding restriction setting comprises a bitmap indicating a restricted precoding parameter corresponding to a precoding codebook.

Example 67 includes the subject matter of any one of Examples 64-66, and optionally, wherein the precoding restriction setting comprises a CodebookSubsetRestriction Information Element (IE) and a Number Of CSI Reference Signals (CSI-RS) Antenna Ports IE.

Example 68 includes the subject matter of any one of Examples 64-67, and optionally, wherein the backhaul link comprises an X2 Application Protocol (X2-AP) link.

Example 69 includes the subject matter of Example 64-68, and optionally, comprising sending an X2 load information message including the precoding restriction setting.

Example 70 includes a method to be performed at an Evolved Node B (eNB), the method comprising communicating with a User Equipment (UE); determining a Relative Narrowband Transmit (Tx) Power (RNTP) setting based on downlink communications to the UE, the RNTP setting comprising a plurality of RNTP bitmaps corresponding to respective plurality of different RNTP thresholds; and sending the RNTP setting to another eNB via a backhaul link.

Example 71 includes the subject matter of Example 70, and optionally, comprising receiving an RNTP recommendation from the another eNB, and determining the RNTP setting based on the RNTP recommendation.

Example 72 includes the subject matter of Example 70 or 71, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 73 includes the subject matter of any one of Examples 70-72, and optionally, wherein the backhaul link comprises an X2 Application Protocol (X2-AP) link.

Example 74 includes the subject matter of Example 73, and optionally, comprising sending an X2 load information message including the RNTP setting.

Example 75 includes a method to be performed at an Evolved Node B (eNB), the method comprising communicating with a User Equipment (UE); determining a Relative Wideband Transmit (Tx) Power (RWTP) setting based on downlink communications to the UE, the RWTP setting comprising at least one RWTP bitmap corresponding to at least one respective RWTP threshold; and sending the RWTP setting to another eNB via a backhaul link.

Example 76 includes the subject matter of Example 75, and optionally, comprising receiving an RWTP recommendation from the another eNB, and determining the RWTP setting based on the RWTP recommendation.

Example 77 includes the subject matter of Example 75 or 76, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 78 includes the subject matter of any one of Examples 75-77, and optionally, wherein the RWTP setting includes a plurality of RWTP bitmaps corresponding a respective plurality of RWTP thresholds.

Example 79 includes the subject matter of any one of Examples 75-78, and optionally, wherein the backhaul link comprises an X2 Application Protocol (X2-AP) link.

Example 80 includes the subject matter of Example 79, and optionally, comprising sending an X2 load information message including the RWTP setting.

Example 81 includes a product including one or more tangible computer-readable non-transitory storage media comprising computer-executable instructions operable to, when executed by at least one computer processor, enable the at least one computer processor to implement a method at an Evolved Node B (eNB), the method comprising communicating with a User Equipment (UE); receiving a precoding restriction setting from another eNB via a backhaul link; and scheduling communications of the UE based on the precoding restriction setting.

Example 82 includes the subject matter of Example 81, and optionally, wherein the method comprises sending to the another eNB a precoding restriction recommendation.

Example 83 includes the subject matter of Example 82, and optionally, wherein the method comprises receiving Channel State Information (CSI) from the UE, and determining the precoding restriction recommendation based on the CSI.

Example 84 includes the subject matter of any one of Examples 81-83, and optionally, wherein the precoding restriction setting comprises a bitmap indicating a restricted precoding parameter corresponding to a precoding codebook.

Example 85 includes the subject matter of any one of Examples 81-84, and optionally, wherein the precoding restriction setting comprises a CodebookSubsetRestriction Information Element (IE) and a Number Of CSI Reference Signals (CSI-RS) Antenna Ports IE.

Example 86 includes the subject matter of any one of Examples 81-85, and optionally, wherein the backhaul link comprises a X2 Application Protocol (X2-AP) link.

Example 87 includes the subject matter of Example 86, and optionally, wherein the method comprises receiving an X2 load information message including the precoding restriction setting.

Example 88 includes a product including one or more tangible computer-readable non-transitory storage media comprising computer-executable instructions operable to, when executed by at least one computer processor, enable the at least one computer processor to implement a method at an Evolved Node B (eNB), the method comprising communicating with a User Equipment (UE); receiving a Relative Narrowband Transmit (Tx) Power (RNTP) setting from another eNB via a backhaul link, the RNTP setting comprising a plurality of RNTP bitmaps corresponding to respective plurality of different RNTP thresholds; and scheduling communications of the UE based on the RNTP setting.

Example 89 includes the subject matter of Example 88, and optionally, wherein the method comprises sending to the another eNB an RNTP recommendation.

Example 90 includes the subject matter of Example 89, and optionally, wherein the method comprises receiving Channel State Information (CSI) from the UE, and determining the RNTP recommendation based on the CSI.

Example 91 includes the subject matter of any one of Examples 88-90, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 92 includes the subject matter of any one of Examples 88-91, and optionally, wherein the backhaul link comprises an X2 Application Protocol (X2-AP) link.

Example 93 includes the subject matter of Example 92, and optionally, wherein the method comprises receiving an X2 load information message including the RNTP setting.

Example 94 includes a product including one or more tangible computer-readable non-transitory storage media comprising computer-executable instructions operable to, when executed by at least one computer processor, enable the at least one computer processor to implement a method at an Evolved Node B (eNB), the method comprising communicating with a User Equipment (UE); receiving a Relative Wideband Transmit (Tx) Power (RWTP) setting from another eNB via a backhaul link, the RWTP setting comprising at least one RWTP bitmap corresponding to at least one respective RWTP threshold; and scheduling communications of the UE based on the RWTP setting.

Example 95 includes the subject matter of Example 94, and optionally, wherein the method comprises sending to the another eNB an RWTP recommendation.

Example 96 includes the subject matter of Example 95, and optionally, wherein the method comprises receiving Channel State Information (CSI) from the UE, and determining the RWTP recommendation based on the CSI.

Example 97 includes the subject matter of any one of Examples 94-96, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 98 includes the subject matter of any one of Examples 94-97, and optionally, wherein the RWTP setting includes a plurality of RWTP bitmaps corresponding a respective plurality of RWTP thresholds.

Example 99 includes the subject matter of any one of Examples 94-98, and optionally, wherein the backhaul link comprises an X2 Application Protocol (X2-AP) link.

Example 100 includes the subject matter of Example 99, and optionally, wherein the method comprises receiving an X2 load information message including the RWTP setting.

Example 101 includes a product including one or more tangible computer-readable non-transitory storage media comprising computer-executable instructions operable to, when executed by at least one computer processor, enable the at least one computer processor to implement a method at an Evolved Node B (eNB), the method comprising communicating with a User Equipment (UE); determining a precoding restriction setting based on downlink communications to the UE; and sending the precoding restriction setting to another eNB via a backhaul link.

Example 102 includes the subject matter of Example 101, and optionally, wherein the method comprises receiving a precoding restriction recommendation from the another eNB, and determining the precoding restriction setting based on the precoding restriction recommendation.

Example 103 includes the subject matter of Example 101 or 102, and optionally, wherein the precoding restriction setting comprises a bitmap indicating a restricted precoding parameter corresponding to a precoding codebook.

Example 104 includes the subject matter of any one of Examples 101-103, and optionally, wherein the precoding restriction setting comprises a CodebookSubsetRestriction Information Element (IE) and a Number Of CSI Reference Signals (CSI-RS) Antenna Ports IE.

Example 105 includes the subject matter of any one of Examples 101-104, and optionally, wherein the backhaul link comprises an X2 Application Protocol (X2-AP) link.

Example 106 includes the subject matter of Example 105, and optionally, wherein the method comprises sending an X2 load information message including the precoding restriction setting.

Example 107 includes a product including one or more tangible computer-readable non-transitory storage media comprising computer-executable instructions operable to, when executed by at least one computer processor, enable the at least one computer processor to implement a method at an Evolved Node B (eNB), the method comprising communicating with a User Equipment (UE); determining a Relative Narrowband Transmit (Tx) Power (RNTP) setting based on downlink communications to the UE, the RNTP setting comprising a plurality of RNTP bitmaps corresponding to respective plurality of different RNTP thresholds; and sending the RNTP setting to another eNB via a backhaul link.

Example 108 includes the subject matter of Example 107, and optionally, wherein the method comprises receiving an RNTP recommendation from the another eNB, and determining the RNTP setting based on the RNTP recommendation.

Example 109 includes the subject matter of Example 107 or 108, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 110 includes the subject matter of any one of Examples 107-109, and optionally, wherein the backhaul link comprises an X2 Application Protocol (X2-AP) link.

Example 111 includes the subject matter of Example 110, and optionally, wherein the method comprises sending an X2 load information message including the RNTP setting.

Example 112 includes a product including one or more tangible computer-readable non-transitory storage media comprising computer-executable instructions operable to, when executed by at least one computer processor, enable the at least one computer processor to implement a method at an Evolved Node B (eNB), the method comprising communicating with a User Equipment (UE); determining a Relative Wideband Transmit (Tx) Power (RWTP) setting based on downlink communications to the UE, the RWTP setting comprising at least one RWTP bitmap corresponding to at least one respective RWTP threshold; and sending the RWTP setting to another eNB via a backhaul link.

Example 113 includes the subject matter of Example 112, and optionally, wherein the method comprises receiving an RWTP recommendation from the another eNB, and determining the RWTP setting based on the RWTP recommendation.

Example 114 includes the subject matter of Example 112 or 113, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 115 includes the subject matter of any one of Examples 112-114, and optionally, wherein the RWTP setting includes a plurality of RWTP bitmaps corresponding a respective plurality of RWTP thresholds.

Example 116 includes the subject matter of any one of Examples 112-115, and optionally, wherein the backhaul link comprises an X2 Application Protocol (X2-AP) link.

Example 117 includes the subject matter of Example 116, and optionally, wherein the method comprises sending an X2 load information message including the RWTP setting.

Example 118 includes an Evolved Node B (eNB) comprising means for communicating with a User Equipment (UE); means for receiving a precoding restriction setting from another eNB via a backhaul link; and means for scheduling communications of the UE based on the precoding restriction setting.

Example 119 includes the subject matter of Example 118, and optionally, comprising means for sending to the another eNB a precoding restriction recommendation.

Example 120 includes the subject matter of Example 119, and optionally, comprising means for receiving Channel State Information (CSI) from the UE, and determining the precoding restriction recommendation based on the CSI.

Example 121 includes the subject matter of any one of Examples 118-120, and optionally, wherein the precoding restriction setting comprises a bitmap indicating a restricted precoding parameter corresponding to a precoding codebook.

Example 122 includes the subject matter of any one of Examples 118-121, and optionally, wherein the precoding restriction setting comprises a CodebookSubsetRestriction Information Element (IE) and a Number Of CSI Reference Signals (CSI-RS) Antenna Ports IE.

Example 123 includes the subject matter of any one of Examples 118-122, and optionally, wherein the backhaul link comprises a X2 Application Protocol (X2-AP) link.

Example 124 includes the subject matter of Example 123, and optionally, comprising means for receiving an X2 load information message including the precoding restriction setting.

Example 125 includes an Evolved Node B (eNB) comprising means for communicating with a User Equipment (UE); means for receiving a Relative Narrowband Transmit (Tx) Power (RNTP) setting from another eNB via a backhaul link, the RNTP setting comprising a plurality of RNTP bitmaps corresponding to respective plurality of different RNTP thresholds; and means for scheduling communications of the UE based on the RNTP setting.

Example 126 includes the subject matter of Example 125, and optionally, comprising means for sending to the another eNB an RNTP recommendation.

Example 127 includes the subject matter of Example 126, and optionally, comprising means for receiving Channel State Information (CSI) from the UE, and determining the RNTP recommendation based on the CSI.

Example 128 includes the subject matter of any one of Examples 125-127, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 129 includes the subject matter of any one of Examples 125-128, and optionally, wherein the backhaul link comprises an X2 Application Protocol (X2-AP) link.

Example 130 includes the subject matter of Example 129, and optionally, comprising means for receiving an X2 load information message including the RNTP setting.

Example 131 includes an Evolved Node B (eNB) comprising communicating with a User Equipment (UE); receiving a Relative Wideband Transmit (Tx) Power (RWTP) setting from another eNB via a backhaul link, the RWTP setting comprising at least one RWTP bitmap corresponding to at least one respective RWTP threshold; and scheduling communications of the UE based on the RWTP setting.

Example 132 includes the subject matter of Example 131, and optionally, comprising means for sending to the another eNB an RWTP recommendation.

Example 133 includes the subject matter of Example 132, and optionally, comprising means for receiving Channel State Information (CSI) from the UE, and determining the RWTP recommendation based on the CSI.

Example 134 includes the subject matter of any one of Examples 131-133, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 135 includes the subject matter of any one of Examples 131-134, and optionally, wherein the RWTP setting includes a plurality of RWTP bitmaps corresponding a respective plurality of RWTP thresholds.

Example 136 includes the subject matter of any one of Examples 131-135, and optionally, wherein the backhaul link comprises an X2 Application Protocol (X2-AP) link.

Example 137 includes the subject matter of Example 136, and optionally, comprising means for receiving an X2 load information message including the RWTP setting.

Example 138 includes an Evolved Node B (eNB) comprising means for communicating with a User Equipment (UE); means for determining a precoding restriction setting based on downlink communications to the UE; and means for sending the precoding restriction setting to another eNB via a backhaul link.

Example 139 includes the subject matter of Example 138, and optionally, comprising means for receiving a precoding restriction recommendation from the another eNB, and determining the precoding restriction setting based on the precoding restriction recommendation.

Example 140 includes the subject matter of Example 138 or 139, and optionally, wherein the precoding restriction setting comprises a bitmap indicating a restricted precoding parameter corresponding to a precoding codebook.

Example 141 includes the subject matter of any one of Examples 138-140, and optionally, wherein the precoding restriction setting comprises a CodebookSubsetRestriction Information Element (IE) and a Number Of CSI Reference Signals (CSI-RS) Antenna Ports IE.

Example 142 includes the subject matter of any one of Examples 138-141, and optionally, wherein the backhaul link comprises an X2 Application Protocol (X2-AP) link.

Example 143 includes the subject matter of Example 142, and optionally, comprising means for sending an X2 load information message including the precoding restriction setting.

Example 144 includes an Evolved Node B (eNB) comprising means for communicating with a User Equipment (UE); means for determining a Relative Narrowband Transmit (Tx) Power (RNTP) setting based on downlink communications to the UE, the RNTP setting comprising a plurality of RNTP bitmaps corresponding to respective plurality of different RNTP thresholds; and means for sending the RNTP setting to another eNB via a backhaul link.

Example 145 includes the subject matter of Example 144, and optionally, comprising means for receiving an RNTP recommendation from the another eNB, and determining the RNTP setting based on the RNTP recommendation.

Example 146 includes the subject matter of Example 144 or 145, and optionally, wherein an RNTP bitmap of the plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

Example 147 includes the subject matter of any one of Examples 144-146, and optionally, wherein the backhaul link comprises an X2 Application Protocol (X2-AP) link.

Example 148 includes the subject matter of Example 147, and optionally, comprising means for sending an X2 load information message including the RNTP setting.

Example 149 includes an Evolved Node B (eNB) comprising means for communicating with a User Equipment (UE); means for determining a Relative Wideband Transmit (Tx) Power (RWTP) setting based on downlink communications to the UE, the RWTP setting comprising at least one RWTP bitmap corresponding to at least one respective RWTP threshold; and means for sending the RWTP setting to another eNB via a backhaul link.

Example 150 includes the subject matter of Example 149, and optionally, comprising means for receiving an RWTP recommendation from the another eNB, and determining the RWTP setting based on the RWTP recommendation.

Example 151 includes the subject matter of Example 149 or 150, and optionally, wherein the RWTP bitmap comprises a plurality of bits corresponding to a respective plurality of time domain resource elements, a bit corresponding to a time domain resource element to indicate if a transmit power of the time domain resource element is not to exceed the RWTP threshold.

Example 152 includes the subject matter of any one of Examples 149-151, and optionally, wherein the RWTP setting includes a plurality of RWTP bitmaps corresponding a respective plurality of RWTP thresholds.

Example 153 includes the subject matter of any one of Examples 149-152, and optionally, wherein the backhaul link comprises an X2 Application Protocol (X2-AP) link.

Example 154 includes the subject matter of Example 153, and optionally, comprising means for sending an X2 load information message including the RWTP setting.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An Evolved Node B (eNB) comprising:
a cellular transceiver to communicate with a User Equipment (UE), the cellular transceiver to receive Channel State Information (CSI) from the UE;
a backhaul interface to communicate with another eNB via a backhaul link; and
a controller to determine a Relative Transmit (Tx) Power recommendation based at least on the CSI from the UE, the controller to cause the backhaul interface to send a first message comprising the Relative Tx Power recommendation to the another eNB via the backhaul link, the Relative Tx Power recommendation comprising a plurality of Relative Tx Power bitmaps corresponding to a respective plurality of different Relative Tx Power thresholds, the controller to process a second message comprising a Relative Tx Power setting from the another eNB, the controller to schedule communications of the UE based on the Relative Tx Power setting from the another eNB.

2. The eNB of claim 1, wherein said Relative Tx Power setting is based at least on said Relative Tx Power recommendation.

3. The eNB of claim 1, wherein said CSI comprises at least one of a Precoding Matrix indicator (PMI), a Channel Quality Indicator (CQI), a Rank Indicator (RI), or a Precoding Type Indicator (PTI).

4. The eNB of claim 1, wherein said second message comprises a bitmap indicating a restricted precoding parameter corresponding to a precoding codebook.

5. The eNB of claim 1, wherein said second message comprises a CodebookSubsetRestriction Information Element (IE) and a Number Of CSI Reference Signals (CSI-RS) Antenna Ports IE, the Number of CSI-RS Antenna Ports IE to indicate a codebook for precoding restrictions, the CodebookSubsetRestriction IE comprising a restricted precoding parameter corresponding to the codebook indicated by the Number of CSI-RS Antenna Ports IE.

6. The eNB of claim 1, wherein said backhaul interface comprises an X2 Application Protocol (X2-AP) interface.

7. The eNB of claim 6, wherein said backhaul interface is to receive an X2 load information message including the Relative Tx Power setting.

8. The eNB of claim 1 comprising one or more antennas; a memory and a processor.

9. An Evolved Node B (eNB) comprising:
 a cellular transceiver to communicate with a User Equipment (UE);
 a backhaul interface to receive from another eNB via a backhaul link a first message comprising a Relative Narrowband Transmit (Tx) Power (RNTP) recommendation; and
 a controller to determine an RNTP setting based on the RNTP recommendation from the another eNB and downlink communications to said UE, the RNTP setting comprising a plurality of RNTP bitmaps corresponding to a respective plurality of different RNTP thresholds, the controller to trigger the backhaul interface to send a second message comprising the RNTP setting to the another eNB via the backhaul link.

10. The eNB of claim 9, wherein said second message comprises at least a first threshold Information Element (IE), a first RNTP IE, a second threshold IE, and a second RNTP IE, the first threshold IE comprising a first threshold value, the first RNTP IE comprising a first RNTP bitmap representing RNTP values relative to the first threshold value, the second threshold IE comprising a second threshold value, and the second RNTP IE comprising a second RNTP bitmap representing RNTP values relative to the second threshold value.

11. The eNB of claim 9, wherein an RNTP bitmap of said plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

12. The eNB of claim 9, wherein said backhaul interface comprises an X2 Application Protocol (X2-AP) interface.

13. The eNB of claim 12, wherein said backhaul interface is to send an X2 load information message including the RNTP setting.

14. The eNB of claim 9 comprising one or more antennas; a memory and a processor.

15. A method to be performed at an Evolved Node B (eNB), the method comprising:
 communicating with a User Equipment (UE);
 receiving from the UE Channel State Information (CSI);
 determining a Relative Wideband Transmit (Tx) Power (RWTP) recommendation based at least on the CSI from the UE;
 sending a first message comprising the RWTP recommendation to another eNB via a backhaul link;
 receiving a second message comprising an RWTP setting from the another eNB via the backhaul link, the RWTP setting comprising a plurality of RWTP bitmaps corresponding to a respective plurality of different RWTP thresholds; and
 scheduling communications of the UE based on the RWTP setting from the another eNB.

16. The method of claim 15, wherein the RWTP setting is based at least on the RWTP recommendation.

17. The method of claim 15, wherein said second message comprises at least a first threshold Information Element (IE), a first RWTP IE, a second threshold IE, and a second RWTP IE, the first threshold IE comprising a first threshold value, the first RWTP IE comprising a first RWTP bitmap representing RWTP values relative to the first threshold value, the second threshold IE comprising a second threshold value, and the second RWTP IE comprising a second RWTP bitmap representing RWTP values relative to the second threshold value.

18. The method of claim 15, wherein an RWTP bitmap of the plurality of RWTP bitmaps comprises a plurality of bits corresponding to a respective plurality of time domain resource elements, a bit corresponding to a time domain resource element to indicate if a transmit power of the time domain resource element is not to exceed an RWTP threshold corresponding to the RWTP bitmap.

19. The method of claim 15, wherein said backhaul link comprises an X2 Application Protocol (X2-AP) link.

20. The method of claim 19 comprising receiving an X2 load information message including the RWTP setting.

21. A product including one or more tangible computer-readable non-transitory storage media comprising computer-executable instructions operable to, when executed by at least one computer processor, enable the at least one computer processor to implement operations at an Evolved Node B (eNB), the operations comprising:
 communicating with a User Equipment (UE);
 receiving from the UE Channel State Information (CSI);
 determining a Relative Narrowband Transmit (Tx) Power (RNTP) recommendation based at least on the CSI from the UE;
 sending a first message comprising the RNTP recommendation to another eNB via a backhaul link;
 receiving a second message comprising an RNTP setting from the another eNB via the backhaul link, the RNTP setting comprising a plurality of RNTP bitmaps corresponding to a respective plurality of different RNTP thresholds; and
 scheduling communications of the UE based on the RNTP setting from the another eNB.

22. The product of claim 21, wherein the RNTP setting is based at least on the RNTP recommendation.

23. The product of claim 21, wherein the second message comprises at least a first threshold Information Element (IE), a first RNTP IE, a second threshold IE, and a second RNTP IE, the first threshold IE comprising a first threshold value, the first RNTP IE comprising a first RNTP bitmap representing RNTP values relative to the first threshold value, the second threshold IE comprising a second threshold value, and the second RNTP IE comprising a second RNTP bitmap representing RNTP values relative to the second threshold value.

24. The product of claim 21, wherein an RNTP bitmap of said plurality of RNTP bitmaps comprises a plurality of bits corresponding to a respective plurality of Physical Resource Blocks (PRB), a bit corresponding to a PRB to indicate if a transmit power of the PRB is not to exceed an RNTP threshold corresponding to the RNTP bitmap.

* * * * *